Zenas C. Robbins'
Improved Wooden Horse-Collar.
No. 118,555.   Patented Aug. 29, 1871.
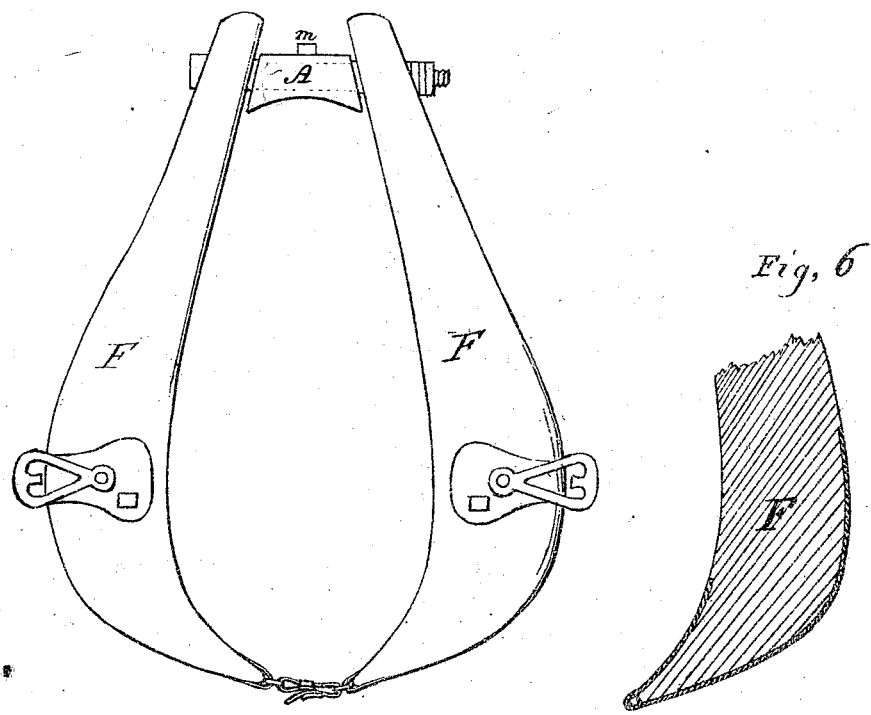
Witnesses,
H. A. Daniels
D. C. Curtis
Inventor,
Zenas C. Robbins

[46.] Zenas C. Robbins'
Improved Wooden Horse-Collar.
3 Sheets--Sheet 2.
No. 118,555. Patented Aug. 29, 1871.
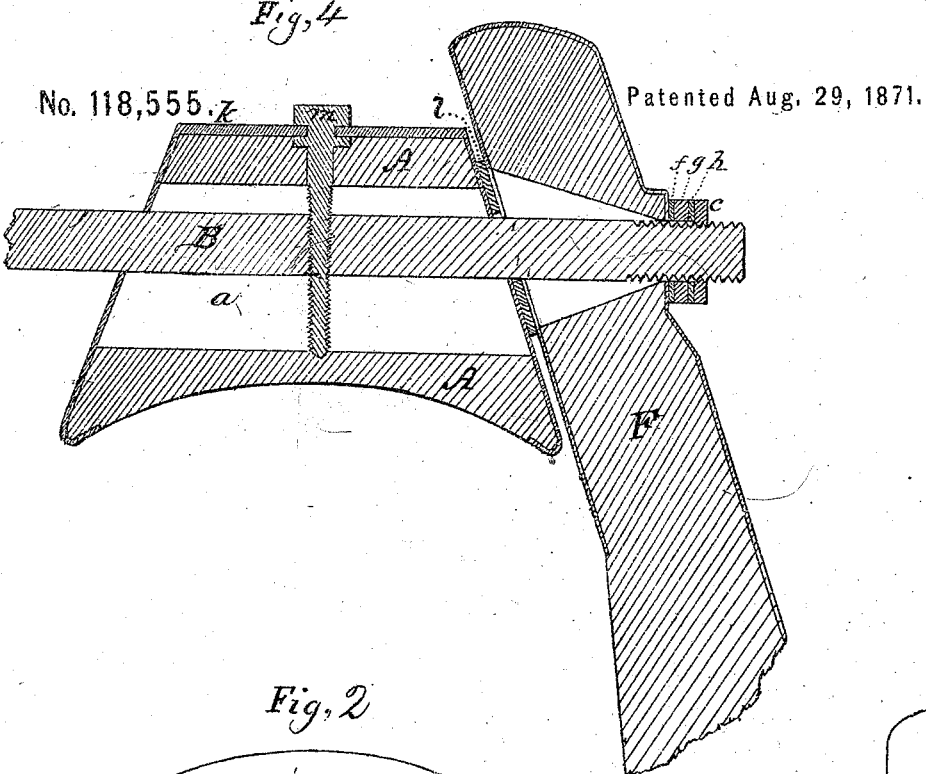
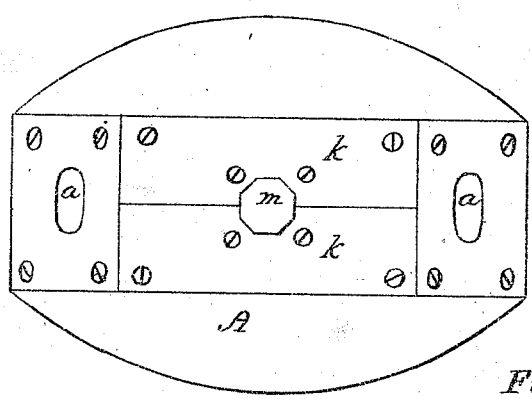
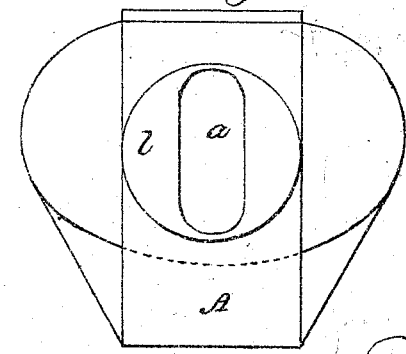
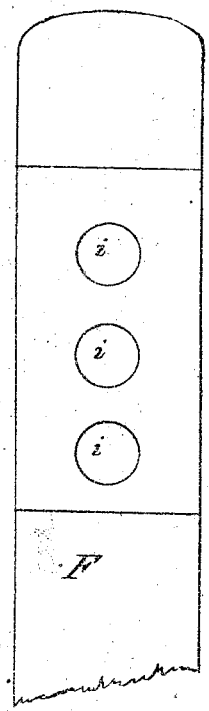
Witnesses,
H. A. Daniels
D. C. Curtis
Inventor,
Zenas C. Robbins

[46.]  3 Sheets--Sheet 3.
ZENAS C. ROBBINS.
Improvement in Wooden Horse-Collars.
No. 118,555.  Patented Aug. 29, 1871.
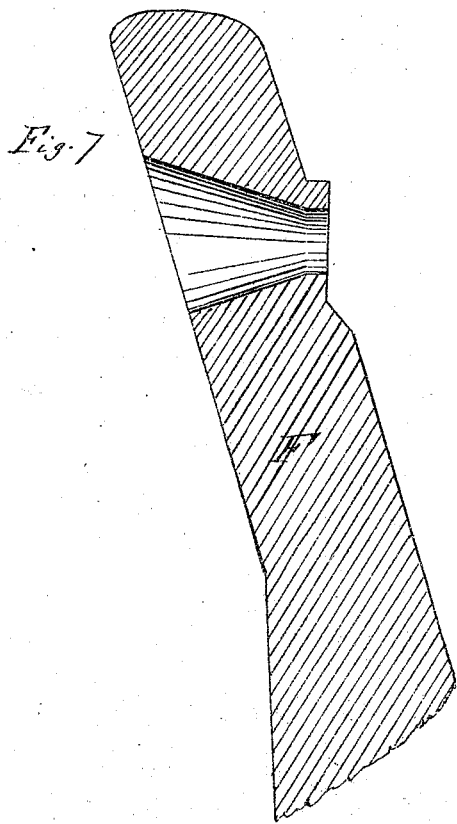
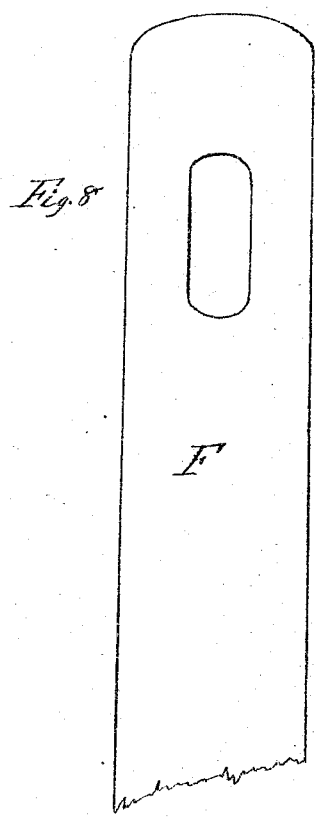

UNITED STATES PATENT OFFICE.

ZENAS C. ROBBINS, OF WASHINGTON, DISTRICT OF COLUMBIA.

IMPROVEMENT IN WOODEN HORSE-COLLARS.

Specification forming part of Letters Patent No. 118,555, dated August 29, 1871.

*To all whom it may concern:*

Be it known that I, ZENAS C. ROBBINS, of Washington, in the District of Columbia, have invented a new and Improved Wooden Horse-Collar; and I do hereby declare that the following is a full and exact description thereof, reference being had to the accompanying drawing which forms a portion of this specification, of which—

Figure 1 is a side view; Fig. 2, a top view of the top section A of the said collar; Fig. 3, an end view of said section; and Figs. 4, 5, and 6 are representations of portions of my said improved horse-collar in detail.

Practical use has fully demonstrated and established the fact that a wooden horse-collar composed of a top section and two side sections is the most perfect of all the horse-collars that human ingenuity has ever produced, provided the respective parts of said collar be of the proper size, shape, and proportions to properly fit the animal upon which it is to be used. But as wood is of an unyielding nature, and there is so great a variation in the sizes and shape of the necks of draft-animals, and even of the same animal when in a high and in a low condition of flesh, it is indispensably necessary to the success of a wooden horse-collar that it should be so contrived and constructed as to admit of such a degree of variation in its length and width as will enable it to be perfectly adapted to different animals, and also to the same animal when in a high and in a low condition of flesh.

The novelty in my improved horse-collar consists in giving such an inward inclination to the upper portions of the side sections F F thereof, and such a shape to its top section A, as will enable the latter to be combined with the former in such a manner that the said top section can be readily adjusted to and secured in any desired outward or inward position within the inner faces of the inclined upper portion of the said side sections of the collar, which capacity for adjustment, as will readily be perceived by an inspection of Fig. 4 of the drawing, enables the collar to be simultaneously and proportionally lengthened and widened by an outward adjustment of its head section, and proportionally shortened and narrowed by an inward adjustment of said section. Fig. 4 represents one of my methods for combining the top section A with the side sections F F of my improved horse-collar. By this method the connecting-bolt B works in a longitudinal slot, $a$, in the said top section, and thence passes outwardly through apertures in the side sections of the collar, and receives upon its screw-cut terminations the requisite screw-nuts to securely but loosely connect the said side sections with each other and with the interposing top section of the collar. A set-screw, $m$, passes vertically through an aperture in the central portion of the top of the head section A, and thence through a screw-aperture in the bolt B. An annular groove is formed in the head of the set-screw $m$, and a semicircular curve in the inner edge of each of the metallic cap-plates $k$ of the top collar section fit into said groove. It will, consequently, be perceived that by revolving the set-screw $m$ in one direction or the other the top section A will be moved outward or inward, as circumstances may require. If the said top section is to be moved outward the screw-nuts $c$ on the bolt B must be first unscrewed to the desired extent; and if the said top section is moved inward the said holding-nuts $c$ must be turned inward to the desired extent, to prevent the connection of the side sections with the said top section of the collar from becoming too loose. For the purpose of enabling the side sections of the collar to vibrate smoothly and with but a small degree of friction upon the connecting-bolt B, metallic washers $l$ may be interposed between the inclined ends of the top section and the inclined inner faces of the side sections of the collar; and to give an elastic bearing of the screw-nuts $c$ upon the outer faces of the side sections, a rubber disk, $g$, interposed between two washers, $f\ h$, may be placed within the said screw-nuts upon the bolt B, as shown in Fig. 4.

In the production of cheaper horse-collars, where a nice degree of adjustment of the position of the top section within the side sections thereof may not be deemed essential, a series of holes, $i\ i$, may be formed laterally through the inclined upper portions of the said side sections, as shown in Fig. 5, for the reception of the end portions of the connecting-bolt B, which, in such case, will pass through an aperture instead of a slot in the top section of the collar.

The lower ends of my improved horse-collar may be connected to each other by means of a strap and buckle, the said strap passing through metallic loops secured in any suitable manner to said sections; or the lower ends of said side sections may be connected to each other by any other suitable means that will permit of a free vibration of the same to suit the movements of a draft-animal when in motion.

I do not intend to limit myself to any precise shape or proportions of the within-mentioned respective component parts of my improved horse-collar, while I give to a wooden horse-collar the capacity of adjustment in size, substantially as herein set forth.

In the construction of my improved horse-collar I shall sometimes make the upper and lower sides of the bolt-holes in the side sections of said collar to incline from each other as they pass inward, as shown in Figs. 4, 7, and 8, Sheet 3, for the purpose of enabling the top section A to be adjusted to any desired position without rendering it necessary to make any change in the connection of the lower ends of the side sections of the collar; and also for the purpose of enabling the connection of the lower ends of the side sections of the collar to be varied and adjusted without rendering it necessary to change the position of the top section thereof.

I do not intend to limit myself exclusively to wood as the material to be employed in the manufacture of the respective sections of my improved horse-collar.

I claim as my invention—

1. The combination of the top section A with the inwardly-inclined upper ends of the side sections F F, substantially as herein set forth, said combination being such that it enables the said top section to be accurately adjusted to any desired upper or lower position within the inclined upper portions of the side sections, while it enables the ends of said side sections to be so adjusted as to properly proportion the width of my improved horse-collar to all variations in the length of the same, and also enables them to be so adjusted as to adapt the collar to the varying shapes of the necks of the animals that are to wear the same.

2. The longitudinally-slotted top section A, combined with the side sections F F by means of the bolt B, and secured in its proper position between said side sections by means of the set-screw $m$, substantially as described.

3. The combination of the set-screw $m$ with the top section A, the screw-bolt B, and the side sections F F, substantially as and for the purpose herein set forth.

4. The inward enlargement, in an obliquely-longitudinal direction of the bolt-holes in the side sections F F, when the shape of the outer ends of said bolt-holes is such as to cause them to loosely embrace the bolt B, substantially as and for the purpose herein set forth.

5. The combination of the side sections F F with the top section A, the connecting-bolt B, the elastic washers $g$, and the screw-nuts $c$, substantially as herein set forth.

ZENAS C. ROBBINS.

Witnesses:
D. C. CURTIS,
EDM. F. BROWN. (46.)